(12) United States Patent
Kuboki et al.

(10) Patent No.: US 10,985,415 B2
(45) Date of Patent: Apr. 20, 2021

(54) POWER STORAGE MODULE WITH COOLING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hideyuki Kuboki, Mie (JP); Hiroki Hirai, Mie (JP); Makoto Higashikozono, Mie (JP); Akihisa Hosoe, Osaka (JP); Yoshiyuki Hirose, Osaka (JP); Akihiro Nagafuchi, Osaka (JP); Tomoharu Takeyama, Osaka (JP); Eiichi Kobayashi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 152 days.

(21) Appl. No.: 16/335,500

(22) PCT Filed: Sep. 13, 2017

(86) PCT No.: PCT/JP2017/032983
§ 371 (c)(1),
(2) Date: Mar. 21, 2019

(87) PCT Pub. No.: WO2018/061761
PCT Pub. Date: Apr. 5, 2018

(65) Prior Publication Data
US 2019/0221902 A1 Jul. 18, 2019

(30) Foreign Application Priority Data

Sep. 30, 2016 (JP) .............................. JP2016-193270

(51) Int. Cl.
*H01M 10/613* (2014.01)
*H01M 10/6554* (2014.01)
(Continued)

(52) U.S. Cl.
CPC .......... *H01M 10/613* (2015.04); *H01G 11/12* (2013.01); *H01G 11/18* (2013.01);
(Continued)

(58) Field of Classification Search
CPC ........... H01M 10/655; H01M 10/6554; H01M 10/6552; H01M 10/613
See application file for complete search history.

(56) References Cited

U.S. PATENT DOCUMENTS 6,082,443 A * 7/2000 Yamamoto .......... F28D 15/0233
165/104.21
7,469,740 B2 * 12/2008 Lin ........................ B23P 15/26
165/104.21
(Continued)

FOREIGN PATENT DOCUMENTS

JP H07-66575 A * 3/1995 ............. H01L 23/42
JP 2005108747 A * 4/2005 ............. Y02E 60/10
(Continued)

OTHER PUBLICATIONS

Hiroshi, Kaneda, machine translation of "Film-coating battery and battery pack" (JP2005108747A), published Apr. 2005, Japan (Year: 2005).*

(Continued)

*Primary Examiner* — Maria Laios
*Assistant Examiner* — Jessie L. Walls
(74) *Attorney, Agent, or Firm* — Greenblum & Bernstein, P.L.C.

(57) ABSTRACT

A power storage module includes: a power storage element; a cooling member that is stacked on the power storage element and has a sealing body hermetically sealing a coolant and an absorption member disposed in the sealing body to absorb the coolant; and a heat transfer plate that is stacked on the power storage element with the cooling member sandwiched therebetween. The heat transfer plate is provided with protrusion portions that protrude to the cooling member side.

19 Claims, 8 Drawing Sheets

(51) Int. Cl.
| | | |
|---|---|---|
| *H01M 10/6569* | (2014.01) | |
| *H01M 10/6555* | (2014.01) | |
| *H01M 10/653* | (2014.01) | |
| *H01M 10/6567* | (2014.01) | |
| *H01M 10/647* | (2014.01) | |
| *H01M 10/6566* | (2014.01) | |
| *H01M 10/6557* | (2014.01) | |
| *H01M 10/6551* | (2014.01) | |
| *H01M 10/655* | (2014.01) | |
| *H01M 10/0525* | (2010.01) | |
| *H01M 10/34* | (2006.01) | |
| *H01M 10/625* | (2014.01) | |
| *H01G 11/18* | (2013.01) | |
| *H01G 11/80* | (2013.01) | |
| *H01G 11/12* | (2013.01) | |
| *H01M 10/04* | (2006.01) | |
| *H01M 10/6568* | (2014.01) | |
| *H01M 10/052* | (2010.01) | |
| *H01M 50/20* | (2021.01) | |
| *H01M 50/183* | (2021.01) | |

(52) U.S. Cl.
CPC ........ *H01G 11/80* (2013.01); *H01M 10/0413* (2013.01); *H01M 10/052* (2013.01); *H01M 10/0525* (2013.01); *H01M 10/345* (2013.01); *H01M 10/625* (2015.04); *H01M 10/647* (2015.04); *H01M 10/653* (2015.04); *H01M 10/655* (2015.04); *H01M 10/6551* (2015.04); *H01M 10/6554* (2015.04); *H01M 10/6555* (2015.04); *H01M 10/6557* (2015.04); *H01M 10/6566* (2015.04); *H01M 10/6567* (2015.04); *H01M 10/6568* (2015.04); *H01M 10/6569* (2015.04); *H01M 50/20* (2021.01); *H01M 50/183* (2021.01); *H01M 2220/20* (2013.01)

(56) References Cited

U.S. PATENT DOCUMENTS

| | | | |
|---|---|---|---|
| 2013/0108902 A1* | 5/2013 | Kristofek | ............ H01M 2/1077 |
| | | | 429/72 |
| 2018/0076494 A1 | 3/2018 | Kuboki et al. | |
| 2019/0191589 A1* | 6/2019 | Fitch | ................... F28D 15/0241 |
| 2020/0058972 A1* | 2/2020 | Kawai | ............... H01M 10/6552 |

FOREIGN PATENT DOCUMENTS

| | | |
|---|---|---|
| JP | 2010-211963 A | 9/2010 |
| JP | 2012204129 A * | 10/2012 |
| JP | 2014-216113 A | 11/2014 |
| WO | 2016/148225 A1 | 9/2016 |

OTHER PUBLICATIONS

Nishina, Osamu, machine translation of "Cooling structure of electronic device" (JP H07-66575 A), published Mar. 1995, Japan (Year: 1995).*
Machine translation of JP-2012204129-A (Wakizaka reference) (Year: 2012).*
International Search Report issued in Application No. PCT/JP2017/032983.

* cited by examiner

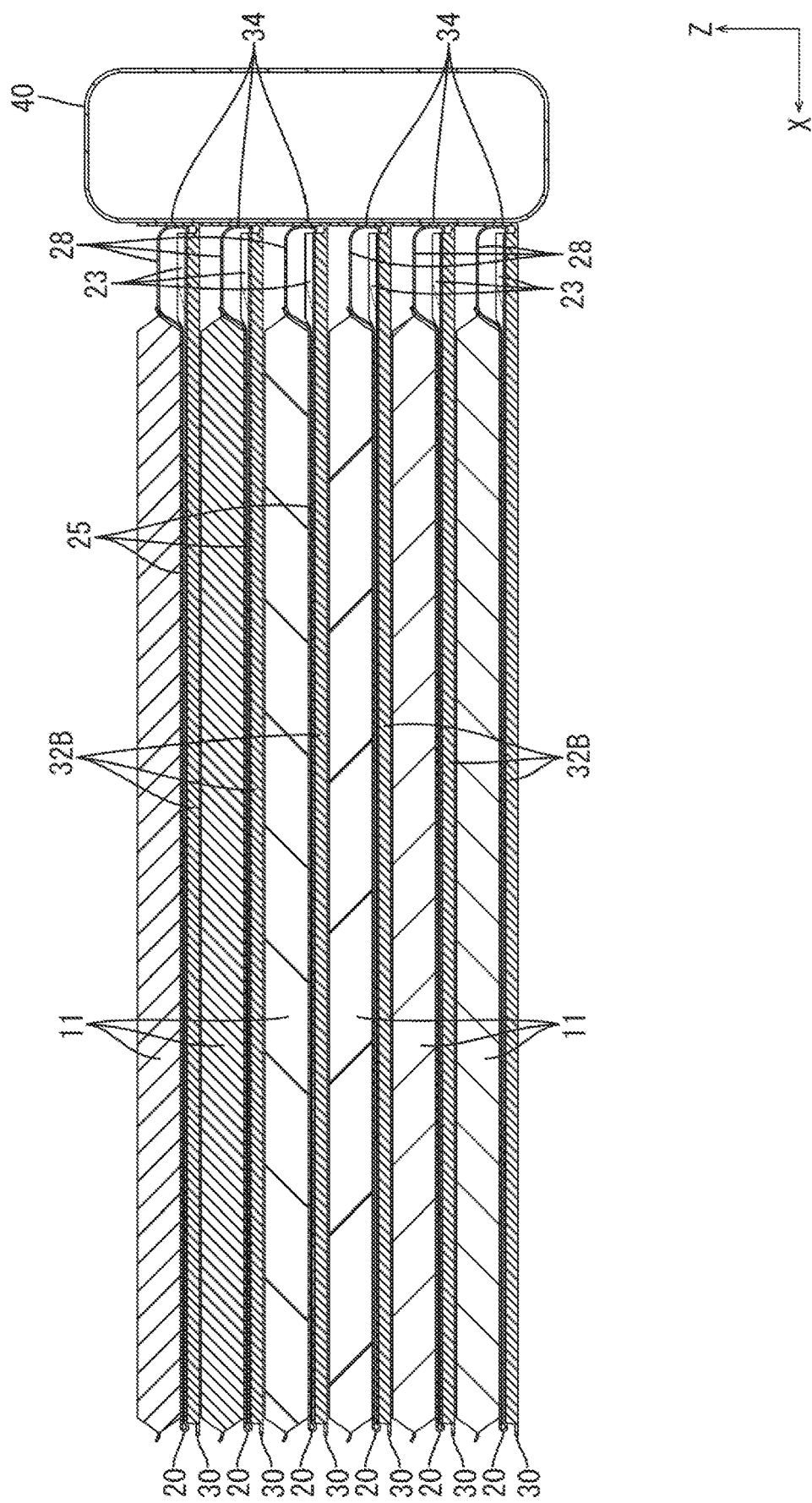

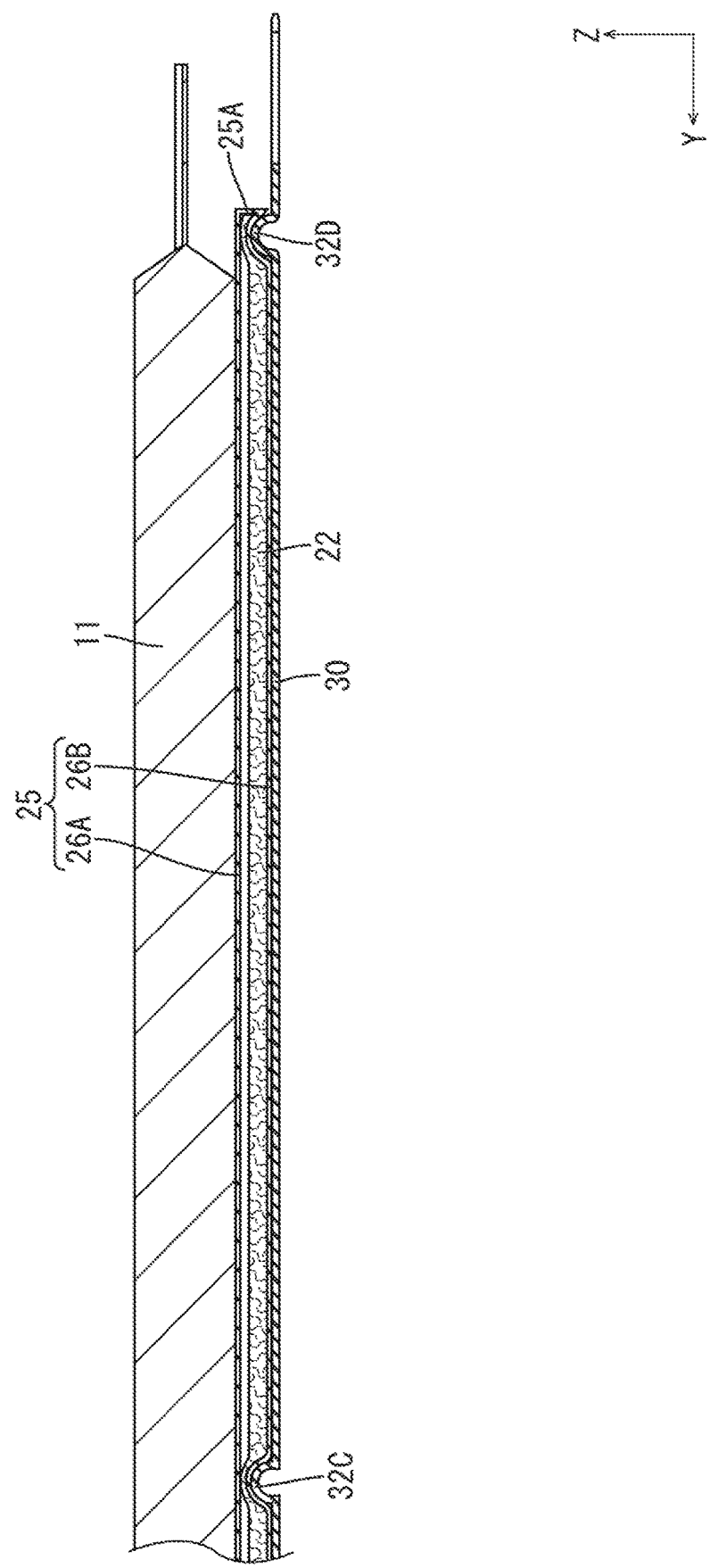

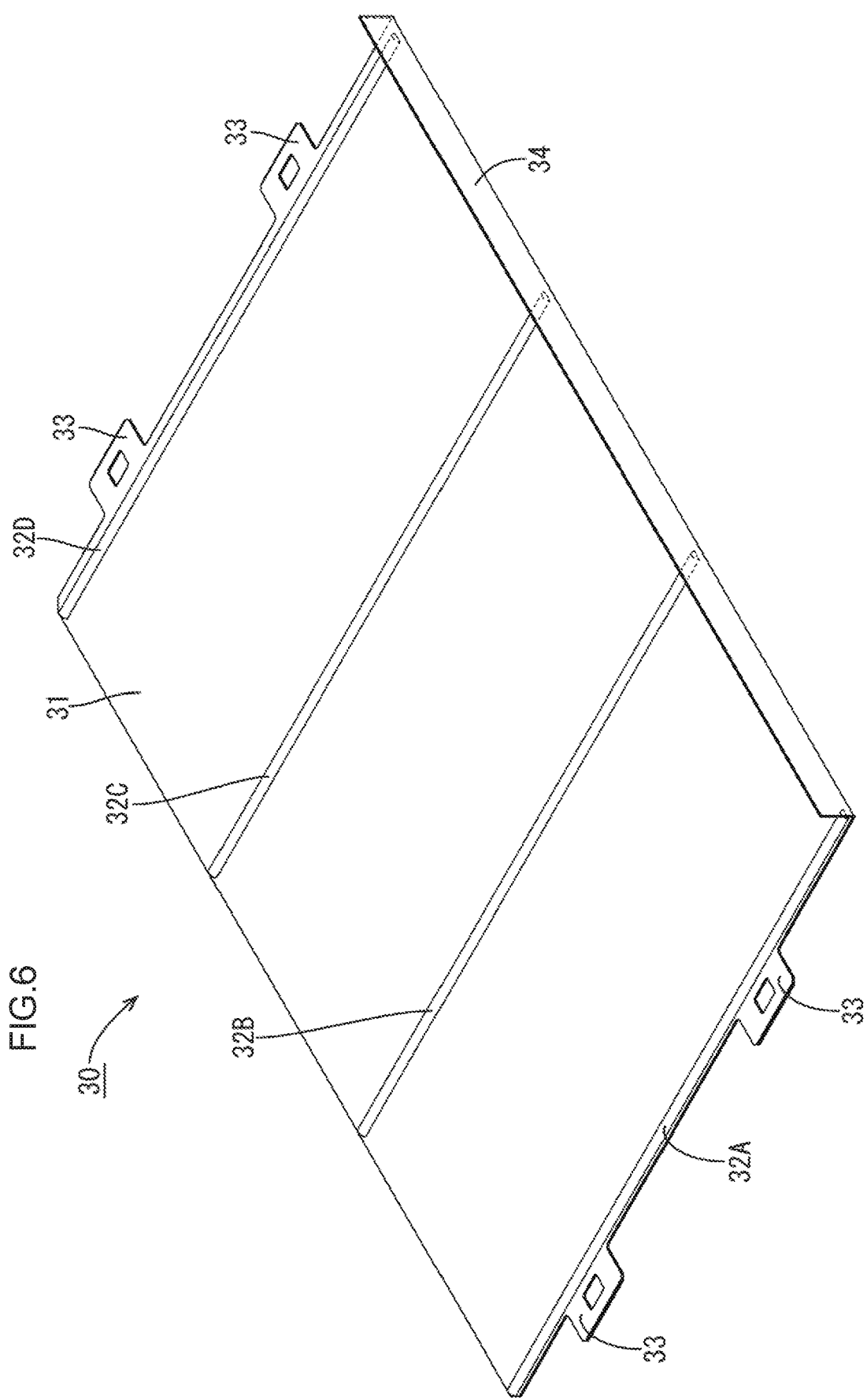

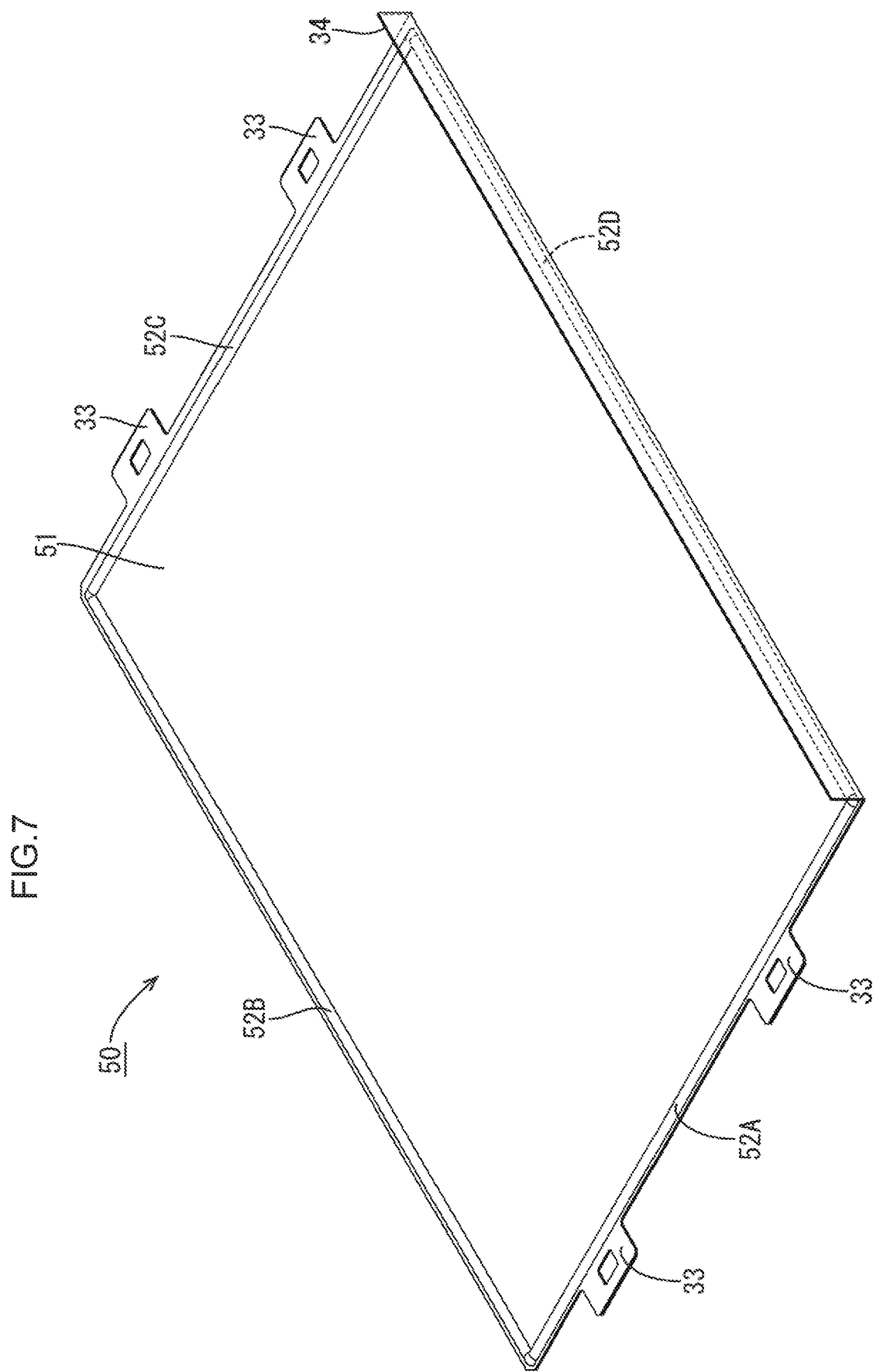

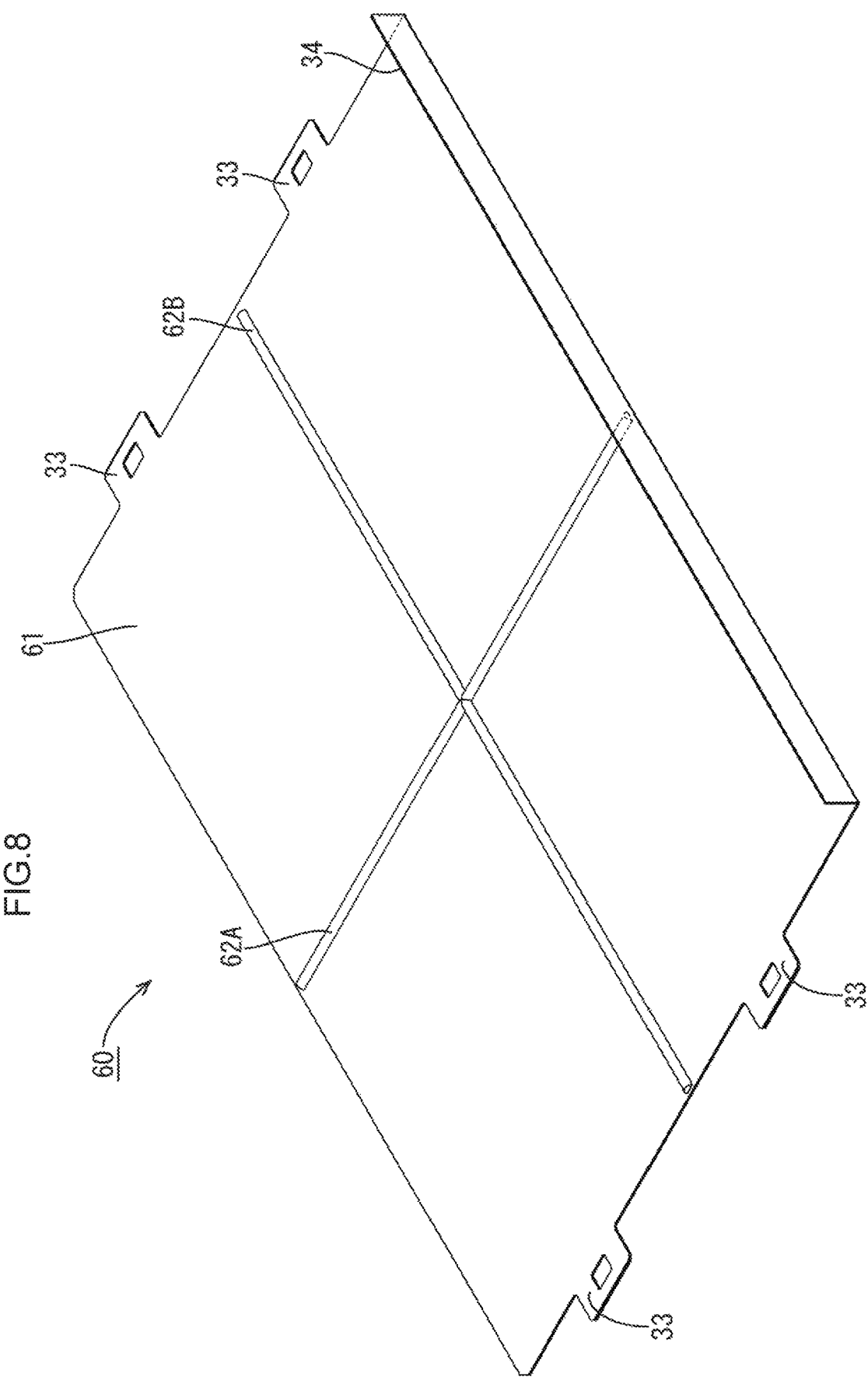

POWER STORAGE MODULE WITH COOLING MEMBER

TECHNICAL FIELD

The present description discloses a technique for cooling a power storage element.

BACKGROUND ART

There has been conventionally known a technique for cooling a power storage element. Patent Document 1 describes that a battery module is stored in a pack case and positive terminals and negative terminals of a plurality of cells are electrically connected together via bus bars. When a coolant charged in the lower portion of the pack case becomes evaporated and condensed in the upper portion of the pack case, the battery is cooled.

RELATED ART DOCUMENT

Patent Document

Patent Document 1: Japanese Unexamined Patent Application Publication No. 2010-211963

DISCLOSURE OF THE PRESENT INVENTION

Problem to be Solved by the Invention

According to the technique described in Patent Document 1, the coolant is to be evaporated and condensed in the pack case, and thus the entire pack case needs to be sealed. This causes a problem that it is not easy to simplify the structure for cooling.

The technique disclosed herein is completed under the foregoing circumstances, and an object of the technique is to simplify the structure for cooling.

Means for Solving the Problem

A power storage module described herein includes: a power storage element; a cooling member that is stacked on the power storage element and has a sealing body hermetically sealing a coolant and an absorption member disposed in the sealing body to absorb the coolant; and a heat transfer plate that is stacked on the power storage element with the cooling member sandwiched therebetween. The heat transfer plate is provided with a protrusion portion that protrudes to the cooling member side.

According to the foregoing configuration, it is possible to dissipate heat of the power storage element to the outside via the cooling member in which the coolant is sealed in the sealing body and the heat transfer plate. Accordingly, as compared to the configuration in which the coolant is charged in a case where the power storage element is stored, for example, the case does not necessarily need to be sealed. This makes it possible to simplify the structure for cooling.

In the configuration in which the cooling member includes the absorption member to absorb the coolant in the sealing body, when the cooling member is sandwiched between the power storage element and the heat transfer plate, the sealing body of the cooling member receives pressure from both sides, and the entire absorption member becomes crushed and do not form a path of the coolant for facilitating the movement of the coolant. In this case, there is a fear of a decrease in cooling performance.

According to the present configuration, the heat transfer plate is provided with the protrusion portion protruding to the cooling member side, and thus the internal absorption member is less prone to become crushed even with a force to sandwich the cooling member between the power storage element and the heat transfer plate. Accordingly, it is possible to suppress a decrease in cooling performance caused by the crushing of the absorption member to absorb the coolant.

Embodiments of the technique described herein are preferably as described below.

The protrusion portion may extend from one side edge portion to another side edge portion opposite to the one side edge portion of the heat transfer plate.

Accordingly, the sealing body and the absorption member deform corresponding to the shape of the protrusion portion to form a path of the coolant in the sealing body along the direction of extension of the protrusion portion. This allows the coolant to move along the direction of extension of the protrusion portion, thereby to facilitate the movement of the coolant and improve cooling performance.

The sealing body may be configured such that a first sheet portion and a second sheet portion are opposed to each other with the absorption member sandwiched therebetween, and the protrusion portion may protrude toward a position of a boundary portion between the first sheet portion and the second sheet portion in the sealing body.

Accordingly, the protrusion portion can support the boundary portion between the first sheet portion and the second sheet portion where the absorption member is relatively prone to become crushed. This suppresses a decrease in cooling performance caused by the crushing of the entire absorption member.

Advantageous Effect of the Invention

According to the technique described herein, it is possible to simplify the structure for cooling.

BRIEF DESCRIPTION OF THE DRAWINGS

FIG. 4 is a cross-sectional view of FIG. 1 taken along line B-B.

FIG. 5 is an enlarged cross-sectional view of a cooling member sandwiched between a power storage element and a heat transfer plate.

FIG. 6 is a perspective view of the heat transfer plate.

FIG. 7 is a perspective view of a heat transfer plate in a second embodiment.

FIG. 8 is a perspective view of a heat transfer plate in a third embodiment.

MODE FOR CARRYING OUT THE INVENTION

First Embodiment

A first embodiment will be described with reference to FIGS. 1 to 6. A power storage module 10 in the present embodiment is mounted in a vehicle such as an electric car or hybrid car, for example, to supply electric power to a load such as a motor. Although the power storage module 10 can be disposed in any orientation, the following descriptions are based on the assumption that an X direction is a leftward direction, a Y direction is a forward direction, and a Z direction is an upward direction.

(Power Storage Module 10)

Figure 3:
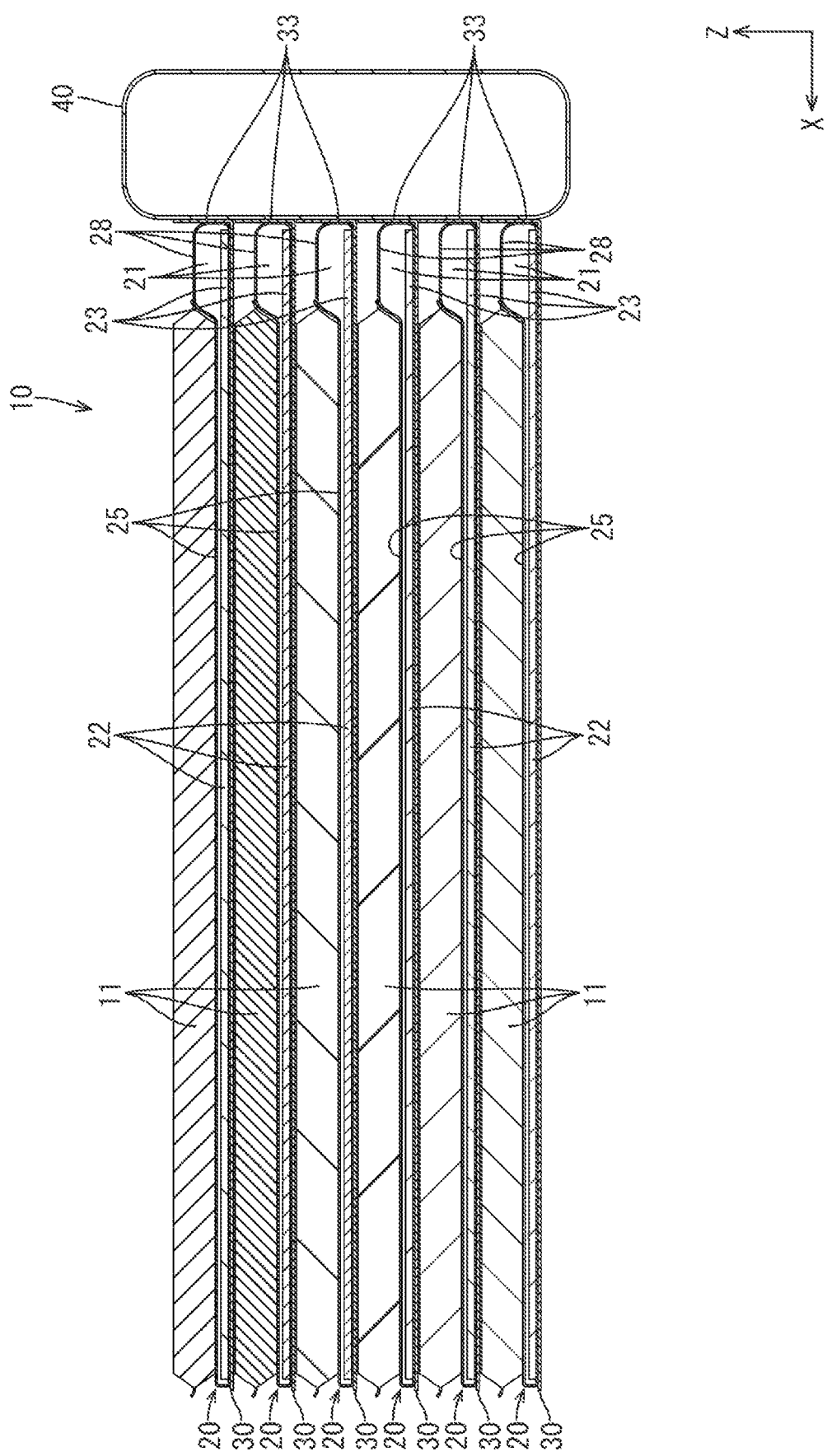
FIG. 3 is a cross-sectional view of FIG. 1 taken along line A-A.

As illustrated in FIG. 3, the power storage module 10 includes: a plurality of (six in the present embodiment) power storage elements 11; a plurality of (six in the present embodiment) cooling members 20 that are stacked on the power storage elements 11 to cool the power storage elements 11; and a plurality of (six in the present embodiment) heat transfer plates 30 that are stacked between the cooling members 20 and the power storage elements 11 to transmit heat of the cooling members 20 and the power storage elements 11.

(Power Storage Elements 11)

Figure 1:
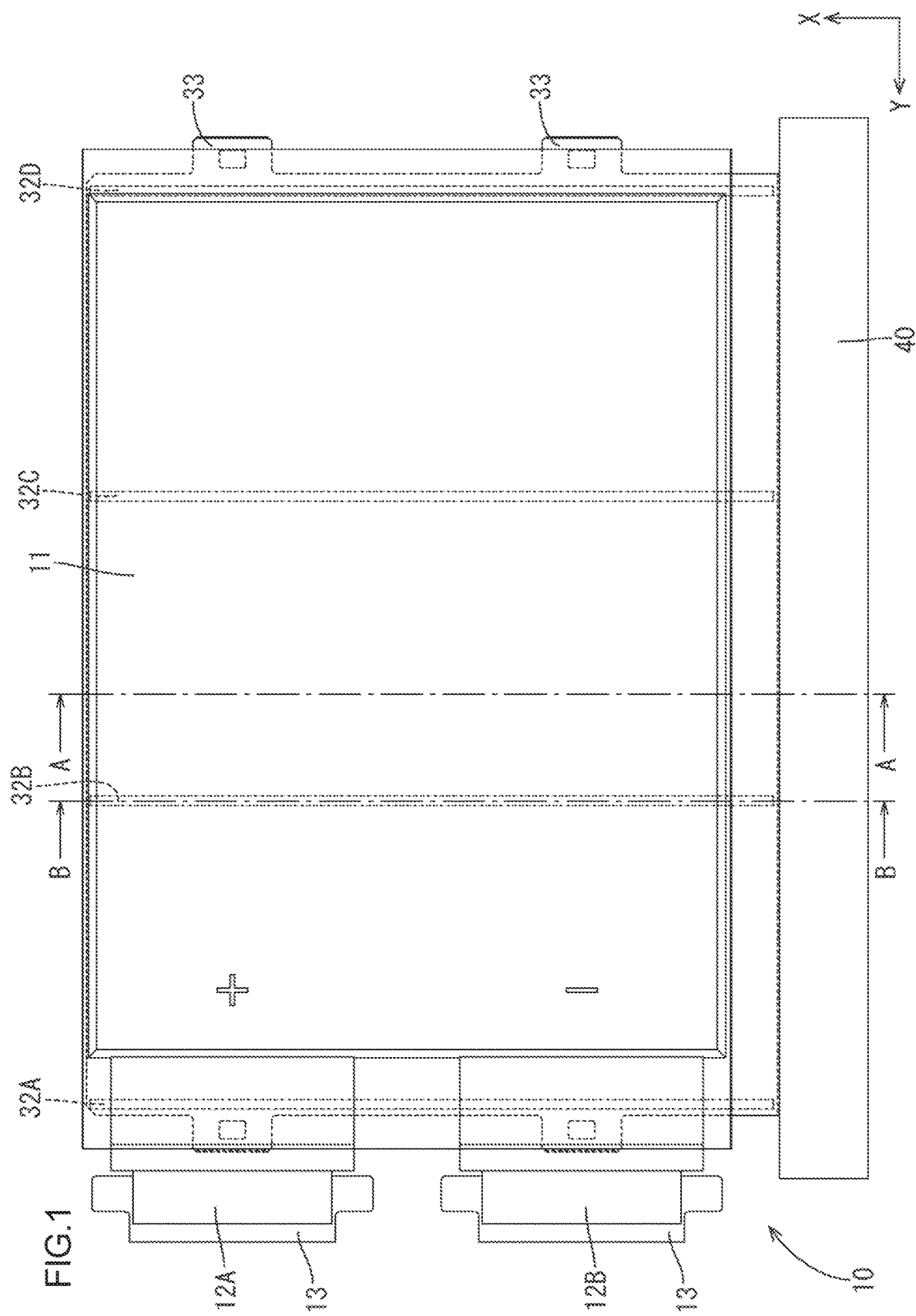
FIG. 1 is a plane view of a power storage module in a first embodiment.
Figure 2:
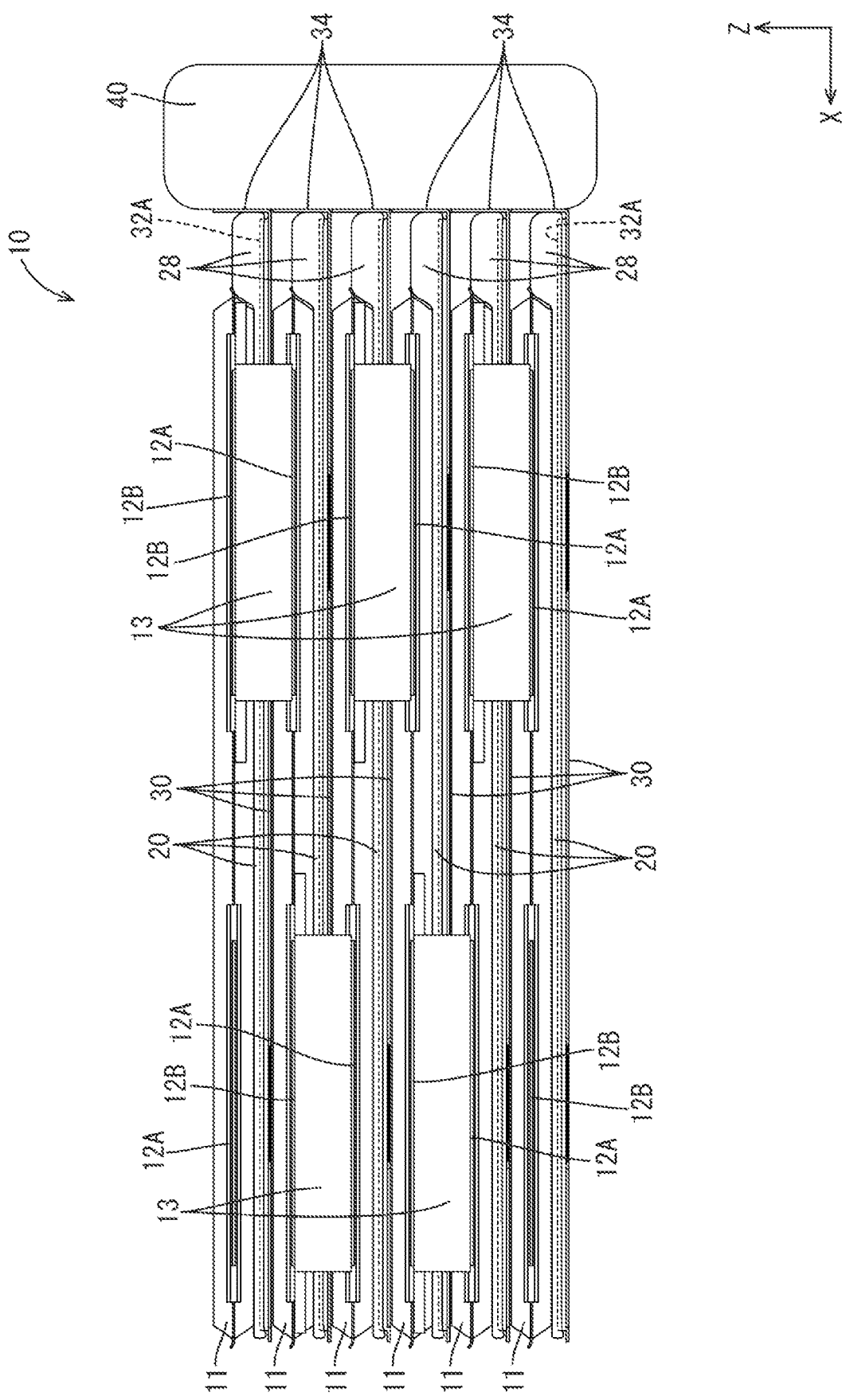
FIG. 2 is a front view of the power storage module.

Each of the power storage elements 11 is formed by sandwiching a power storage factor not illustrated between a pair of battery laminate sheets and bonding side edges of the battery laminate sheets in a liquid-tight manner by a publicly known method such as heat welding. As illustrated in FIG. 2, a positive electrode terminal 12A and a negative electrode terminal 12B in metallic foil form protrude from the front end edge of each of the power storage elements 11, from inside to outside of the battery laminate sheets in a liquid-tight state with the inner surface of the battery laminate sheet. The electrode terminal 12A and the electrode terminal 12B of each of the power storage elements 11 are disposed with a space therebetween and are electrically connected to the internal power storage factor.

The plurality of power storage elements 11 are vertically aligned and the adjacent power storage elements 11 are disposed such that one electrode terminal 12A is positioned next to the other electrode terminal 12B. The adjacent electrode terminal 12A and electrode terminal 12B are electrically connected together via a plurality of (five in the present embodiment) U-shaped connection members 13. The electrode terminals 12A, 12B and the connection members 13 are connected together by a publicly known method such as laser welding, ultrasonic welding, or brazing, for example. The adjacent electrode terminals 12A and 12B are connected by the connection members 13, so that the plurality of power storage elements 11 are connected in series.

In the present embodiment, examples of the power storage elements 11 include secondary batteries such as lithium-ion secondary batteries or nickel-metal-hydride secondary batteries, capacitors such as electric double-layer capacitors or lithium ion capacitors, and any type can be selected as necessary.

(Cooling Members 20)

As illustrated in FIG. 3, each of the cooling members 20 includes a coolant 21 that varies between liquid and gaseous states, an absorption member 22 that absorbs the coolant 21, and a sealing body 25 that hermetically seals the coolant 21 and the absorption member 22. The coolant 21 can be one or more selected from a group consisting of perfluorocarbon, hydrofluoroether, hydrofluoroketone, fluorine inert liquid, water, and alcohols such as methanol and ethanol, for example. The coolant 21 may have insulating properties or conductive properties. The amount of the coolant 21 sealed in the sealing body 25 can be selected as necessary.

(Absorption Members 22)

Each of the absorption members 22 has a substantially rectangular sheet shape and is formed from a material configured to absorb the coolant 21. The absorption member 22 may be formed by processing a material configured to absorb the coolant 21 in fiber form and weaving into a fabric or may be formed from a non-woven fabric. The form of the non-woven fabric may be fiber sheet, web (thin film sheet made of fiber only), or bat (blanket-like fiber). The material for the absorption member 22 may be natural fiber, synthetic fiber formed from synthetic resin, or a combination of natural fiber and synthetic fiber.

The cooling member 20 is disposed in a wide region as compared to the region overlapping the power storage element 11, and thus the absorption member 22 in the sealing body 25 includes an absorption extension portion 23 that is extended from the region overlapping the power storage element 11 to a region not overlapping the power storage element 11.

(Sealing Body 25)

As illustrated in FIG. 5, the sealing body 25 can be formed by stacking and joining (bonding) together substantially rectangular first sheet portion 26A and second sheet portion 26B in a liquid-tight manner by a publicly known method such as adhesion, welding, or deposition, for example. Each of the first sheet portion 26A and the second sheet portion 26B is formed by laminating a synthetic resin film to the both sides of a metallic sheet. The metal constituting the metallic sheet can be any metal selected from aluminum, aluminum alloy, copper, and copper alloy as necessary. The synthetic resin constituting a synthetic resin film can be any synthetic resin selected from polyolefins such as polyethylene and polypropylene, polyesters such as polybutylene terephthalate and polyethylene terephthalate, polyamides such as nylon 6 and nylon 6, 6 as necessary. The sealing body 25 according to the present embodiment is formed by stacking and thermally fusing the surfaces of the first sheet portion 26A and the second sheet portion 26B with synthetic resin films stacked.

The sealing body 25 has a peripheral edge portion where the first sheet portion 26A covering the upper side of the absorption member 22 and the second sheet portion 26B covering the lower side of the absorption member 22 are connected, as a boundary portion 25A. The upper surface of the first sheet portion 26A is in contact with the lower surface of the power storage element 11 and the lower surface of the second sheet portion 26B is in contact with the upper surface of the heat transfer plate 30.

As illustrated in FIG. 3, a portion of the first sheet portion 26A extended in a region not overlapping the power storage element 11 and covering the absorption extension portion 23 of the absorption member 22 is set as a bulging portion 28 that is configured to bulge and deform by evaporation of the coolant 21 in the sealing body 25. The bulging portion 28 is formed when the sealing body 25 becomes deformed and bulged with a rise in the inner pressure of the sealing body 25 caused by evaporation of the coolant 21 in the sealing body 25. The portion of the sealing body 25 other than the bulging portion 28 does not bulge or deform even with a rise in the inner pressure caused by evaporation of the coolant 21 in the sealing body 25 because the portion is in contact with the power storage element 11 and the heat transfer plate 30 and is restricted in bulging.

(Heat Transfer Plates 30)

Each of the heat transfer plates 30 is stacked on the power storage element 11 with the cooling member 20 sandwiched therebetween and is rectangular in shape, and is formed from a member with high heat conductivity such as aluminum, aluminum alloy, copper, or copper alloy, as illustrated in FIG. 6. The heat transfer plate 30 has a flat plate-shaped main body 31 that is in contact with the power storage element 11 and the sealing body 25 and a partition wall 34 that is bent in a direction orthogonal to the main body 31. The main body 31 is provided with a plurality of (four in the present embodiment) protrusion portions 32A to 32D that protrude to the cooling member 20 side to deform the second sheet portion 26B of the sealing body 25.

As illustrated in FIGS. 4 and 5, the plurality of protrusion portions 32A to 32D are substantially the same in plate thickness as the main body 31 and have a semi-arc cross section shape, and are disposed in parallel with a predetermined spacing therebetween in a front-back direction and entirely protrude upward at a constant height. The protrusion portions 32A and 32D at the end portions as seen in the alignment direction press the second sheet portion 26B on the boundary portion 25A side (the inner edge portion side of the sealing body 25) between the first sheet portion 26A and the second sheet portion 26B to deform the second sheet portion 26B and the internal absorption member 22. The protrusion portions 32A to 32D have a strength to such a degree that the protrusion portions 32A to 32D would not suffer plastic deformation even with an external force (for example, bulging of the power storage element 11 and the like) applied to at least the sealing body 25.

The front and back end portions of the main body 31 have plate-shaped protrusion pieces 33. Each of the protrusion pieces 33 has a rectangular through hole that is used for fixation to a case not illustrated, for example. The partition wall 34 is in surface contact with the side surface of the heat dissipation member 40. Accordingly, the heat of the power storage elements 11 transfers to the vertically adjacent heat transfer plates 30 via the bulging portions 28 of the cooling members 20 and transfers from the partition wall 34 to the heat dissipation member 40, and then is dissipated from the heat dissipation member 40 to the outside. Each of the heat transfer plates 30 can be formed by punching and bending a metal plate material by a pressing machine.

(Heat Dissipation Member 40)

As illustrated in FIG. 3, the heat dissipation member 40 is disposed on a lateral side of the power storage module 10 to receive heat from the heat transfer plates 30 and dissipate the heat to the outside. The heat dissipation member 40 is formed from a metal such as aluminum or aluminum alloy and has an inlet opening and an outlet opening for a cooling material not illustrated. A cooling liquid as a cooling material is introduced into the lower inlet opening and discharged from the upper outlet opening. The cooling liquid circulates through a heat dissipation path not illustrated to dissipate heat having been transferred to the cooling liquid to the outside. The heat dissipation member 40 may have a pipe (not illustrated) entirely extending inside with a plurality of folds for passage of the cooling liquid. In the present embodiment, the cooling liquid is water. However, the cooling liquid is not limited to this but may be a liquid such as oil. Alternatively, the cooling liquid may be an antifreeze liquid. In addition, the cooling liquid is not limited to a liquid but may be a gas.

The present embodiment produces the following operations and advantageous effects.

The power storage module 10 includes: the power storage elements 11; the cooling members 20 that are stacked on the power storage elements 11 and have the sealing body 25 hermetically sealing the coolant 21 and the absorption member 22 disposed in the sealing body 25 to absorb the coolant 21; and the heat transfer plates 30 that are stacked on the power storage elements 11 with the cooling members 20 sandwiched therebetween. Each of the heat transfer plates 30 is provided with the protrusion portions 32A to 32D that protrude to the cooling member 20 side.

According to the present embodiment, it is possible to dissipate the heat of the power storage elements 11 via the cooling members 20 in which the coolant 21 is sealed in the sealing body 25 and the heat transfer plates 30. Accordingly, as compared to the configuration in which the coolant 21 is charged in a case where the power storage elements 11 are stored, for example, the case does not necessarily need to be sealed. This makes it possible to simplify the structure for cooling. In the configuration in which the absorption member 22 to absorb the coolant 21 is disposed in the sealing body 25 of the cooling member 20, when the cooling member 20 is sandwiched between the power storage element 11 and the heat transfer plate 30, the sealing body 25 of the cooling member 20 receives pressure from both sides, and the entire absorption member 22 becomes crushed and does not form a path of the coolant 21 for facilitating the movement of the coolant 21. In this case, there is a fear of a decrease in cooling performance.

According to the present embodiment, each of the heat transfer plates 30 is provided with the protrusion portions 32A to 32D protruding to the cooling member 20 side, and thus the internal absorption member 22 is entirely less prone to become crushed even with a force to sandwich the cooling member 20 between the power storage element 11 and the heat transfer plate 30. Accordingly, it is possible to suppress a decrease in cooling performance caused by the crushing of the absorption member 22 to absorb the coolant 21.

The protrusion portions 32A to 32D extend from a (one) side edge portion on the heat dissipation member 40 side of the heat transfer plate 30 to another side edge portion on a side opposite to the heat dissipation member 40 side.

Accordingly, the sealing body 25 and the absorption member 22 deform corresponding to the shapes of the protrusion portions 32A to 32D to form a path of the coolant 21 in the sealing body 25 along the direction of extension of the protrusion portions 32A to 32D. This allows the coolant 21 to move along the direction of extension of the protrusion portions 32A to 32D, thereby to facilitate the movement of the coolant 21 and improve cooling performance.

The sealing body 25 is configured such that the first sheet portion 26A and the second sheet portion 26B are opposed to each other with the absorption member 22 sandwiched therebetween. The protrusion portions 32A and 32D protrude toward the position of the boundary portion 25A between the first sheet portion 26A and the second sheet portion 26B.

Accordingly, the protrusion portions 32A and 32D can support the boundary portion 25A between the first sheet portion 26A and the second sheet portion 26B where the absorption member 22 is relatively prone to become crushed. This suppresses a decrease in cooling performance caused by the crushing of the entire absorption member 22.

Second Embodiment

A second embodiment will be described with reference to FIG. 7. In the second embodiment, protrusion portions 52A to 52D extending in a rectangular shape are provided along the outer peripheral edge portion of a heat transfer plate 50. As for other components, the second embodiment is identical to the first embodiment. Thus, the components identical to those in the first embodiment will be given the reference symbols identical to those in the first embodiment and descriptions thereof will be omitted.

The heat transfer plate 50 has a rectangular plate shape and includes a flat plate-shaped main body 51 and a partition wall 34. The main body 51 has the protrusion portions 52A to 52D protruding in a direction orthogonal to the plate surface. The protrusion portions 52A to 52D extend near the outer peripheral edge of the main body 51 along the outer peripheral edge without interruption over the entire periphery. According to the present embodiment, the protrusion portions 52A to 52D make the absorption member 22 less prone to become crushed on the peripheral edge portion side of the cooling member 20 where the absorption member 22 is relatively prone to become crushed, thereby suppressing a decrease in cooling performance.

Third Embodiment

A third embodiment will be described with reference to FIG. 8. In the third embodiment, a heat transfer plate 60 is provided with protrusion portions 62A and 62B extending in directions orthogonal to each other (crossing each other). As for other components, the third embodiment is identical to the first embodiment. Thus, the components identical to those in the foregoing embodiments will be given the reference symbols identical to those in the foregoing embodiments and descriptions thereof will be omitted. The heat transfer plate 60 has a rectangular plate shape and includes a flat plate-shaped main body 61 and a partition wall 34. The main body 61 has the protrusion portions 62A and 62B protruding in a direction orthogonal to the plate surface. The protrusion portions 62A and 62B extend in directions orthogonal to each other from one edge portion to another edge portion opposite to the one edge portion of the heat transfer plate 60 (the main body 61).

Other Embodiments

The technique described herein is not limited to the embodiments described above and illustrated in the drawings. For example, the following embodiments are included in the scope of the technique described herein:

(1) In the foregoing embodiments, the absorption member 22 is locally crushed by the protrusion portions 32A to 32D, 52A to 52D, 62A, 62B at their positions. However, the present disclosure is not limited to this configuration but the absorption member 22 may not be disposed at the positions of the protrusion portions 32A to 32D, 52A to 52D, 62A, 62B. For example, the absorption member 22 may be divided at the positions of the protrusion portions 32A to 32D, 52A to 52D, 62A, 62B.

(2) The protrusion portions 32A to 32D are formed by bending a metal plate material but the present disclosure is not limited to this. For example, the protrusion portions may be formed by locally thickening a heat transfer plate.

(3) The protrusion portions 32A to 32D, 52A to 52D, 62A, 62B extend linearly. However, the protrusion portions are not limited to this but may extend in a curved manner. There may be one protrusion portion or a plurality of protrusion portions arranged at intervals in the direction of extension of the protrusion portion. Alternatively, a plurality of protrusion portions may be discretely disposed.

(4) The numbers of the power storage elements, the cooling members, and the heat transfer plates are not limited to the numbers in the foregoing embodiments but can be changed as appropriate.

(5) The sealing body 25 is configured such that the separate first sheet portion 26A and second sheet portion 26B are bonded together. However, the sealing body 25 is not limited to this configuration. For example, one sheet member may be folded back to form a first sheet portion and a second sheet portion.

(6) The power storage module 10 may not include the heat dissipation member 40. For example, the power storage module 10 may be covered with a metallic or synthetic resin case not illustrated, so that the heat of the power storage module 10 is dissipated via the case to the outside without the intervention of the heat dissipation member 40. In addition, the case may be a part of the heat dissipation member 40 or the case may cover the entire power storage module 10 including the heat dissipation member 40, for example. In this case, for example, the case may sandwich the power storage module 10 from the upper and lower sides to hold the power storage module 10.

EXPLANATION OF SYMBOLS

10: Power storage module
11: Power storage element
20: Cooling member
21: Coolant
22: Absorption member
25: Sealing body
25A: Boundary portion
26A: First sheet portion
26B: Second sheet portion
30, 50, 60: Heat transfer plate
32A to 32D, 52A to 52D, 62A, 62B: Protrusion portion
40: Heat dissipation member

The invention claimed is:

1. A power storage module, comprising:
a power storage element including a flat surface;
a cooling member including a first surface abutting the flat surface of the power storage element and a second surface opposite the first surface of the cooling member, the cooling member including:
a coolant for cooling the power storage element;
an absorption member having a sheet shape, the absorption member absorbing the coolant; and
a sealing body hermetically sealing the coolant and the absorption member in the sealing body; and
a heat transfer plate abutting the second surface of the cooling member, the heat transfer plate including:
a first flat portion and a second flat portion being parallel to the flat surface of the power storage element; and
at least one protrusion between the first flat portion and second flat portion, the at least one protrusion protruding toward the cooling member, wherein
the cooling member further includes:
at least one flat portion of the second surface of the cooling member abutting the first flat portion of the heat transfer plate; and
at least one deformed portion abutting the at least one protrusion and deformed along a shape of the at least one protrusion.

2. The power storage module according to claim 1, wherein the at least one protrusion has an elongated shape that extends from a first edge to a second edge of the heat transfer plate, and
the first edge and the second edge are opposite each other.

3. The power storage module according to claim 2, wherein
the sealing body of the cooling member includes a first sheet that defines the first surface of the cooling member that abuts the flat surface of the power storage element and a second sheet that defines the second surface of the cooling member that abuts the heat transfer plate,
the first sheet and the second sheet are opposed to each other, edges of the first sheet are connected to edges of the second sheet, respectively, to define a closed space between the first sheet and the second sheet, the absorption member is disposed in the closed space, and the at least one protrusion further includes a protrusion adjacent to a boundary between one of the edges of the first sheet and a corresponding one of the edges of the second sheet.

4. The power storage module according to claim 3, wherein the at least one deformed portion includes:

a deformed portion of the second sheet that abuts the at least one protrusion and deformed along the shape of the at least one protrusion, a deformed portion of the absorption member that abuts the deformed portion of the second sheet and is deformed along the shape of the at least one protrusion, and a flat portion of the first sheet abuts the deformed portion of the absorption member.

5. The power storage module according to claim 4, wherein the heat transfer plate includes a first surface abutting a second sheet that provides the second surface of the cooling member and a second surface opposite the first surface of the heat transfer plate, and the at least one protrusion protrudes from the first surface of the heat transfer plate and is recessed from the second surface of the heat transfer plate.

6. The power storage module according to claim 1, wherein the sealing body of the cooling member includes a first sheet that defines the first surface of the cooling member that abuts the flat surface of the power storage element and a second sheet that defines the second surface of the cooling member that abuts the heat transfer plate, the first sheet and the second sheet are opposed to each other, edges of the first sheet are connected to edges of the second sheet, respectively, to define a closed space between the first sheet and the second sheet, the absorption member is disposed in the closed space, and the at least one protrusion further includes a protrusion adjacent to a boundary between one of the edges of the first sheet and a corresponding one of the edges of the second sheet.

7. The power storage module according to claim 6, wherein the at least one deformed portion includes:

a deformed portion of the second sheet that abuts the at least one protrusion and deformed along the shape of the at least one protrusion, a deformed portion of the absorption member that abuts the deformed portion of the second sheet and is deformed along the shape of the at least one protrusion, and a flat portion of the first sheet abuts the deformed portion of the absorption member.

8. The power storage module according to claim 7, wherein the heat transfer plate includes a first surface abutting a second sheet that provides the second surface of the cooling member and a second surface opposite the first surface of the heat transfer plate, and the at least one protrusion protrudes from the first surface of the heat transfer plate and is recessed from the second surface of the heat transfer plate.

9. The power storage module according to claim 1, wherein the heat transfer plate includes a first surface abutting a second sheet that provides the second surface of the cooling member and a second surface opposite the first surface of the heat transfer plate, and the at least one protrusion protrudes from the first surface of the heat transfer plate and is recessed from the second surface of the heat transfer plate.

10. The power storage module according to claim 1, wherein the heat transfer plate has a rectangular shape, the heat transfer plate includes a first edge and a second edge that are opposite each other and a third edge and a fourth edge that are opposite each other and perpendicular to the first edge and the second edge, the at least one protrusion includes a first protrusion and a second protrusion extending parallel to each other, and each of the first protrusion and the second protrusion has an elongates shape that extends from the first edge to the second edge of the heat transfer plate.

11. The power storage module according to claim 10, wherein the first protrusion is adjacent to the third edge of the heat transfer plate, and the second protrusion is adjacent to the fourth edge of the heat transfer plate.

12. The power storage module according to claim 10, wherein the at least one deformed portion of the cooling member includes a first deformed portion and a second deformed portion, the first deformed portion abuts the first protrusion, and the second deformed portion abuts the second protrusion.

13. The power storage module according to claim 11, wherein the at least one protrusion further includes a third protrusion parallel to the first protrusion and the second protrusion, and the third protrusion is between the first protrusion and the second protrusion.

14. The power storage module according to claim 13, wherein the at least one deformed portion of the cooling member includes a first deformed portion, a second deformed portion, and a third deformed portion, the first deformed portion abuts the first protrusion, the second deformed portion abuts the second protrusion, the third deformed portion abuts the third protrusion, the at least one flat portion of the second surface of the cooling member includes a first flat portion and a second flat portion, the first flat portion is between the first deformed portion and the third deformed protrusion, and the second flat portion is between the second deformed portion and the third deformed portion.

15. The power storage module according to claim 14, wherein the absorption member has a rectangular sheet shape, and the absorption member includes a woven fabric made of fiber.

16. The power storage module according to claim 14, wherein the absorption member has a rectangular sheet shape, and
the absorption member includes a non-woven fabric made of fiber.

17. The power storage module according to claim 11, wherein
the at least one protrusion further includes a third protrusion and a fourth protrusion perpendicular to the first protrusion and the second protrusion,
the third protrusion is adjacent to the first edge of the heat transfer plate, and
the fourth protrusion is adjacent to the second edge of the heat transfer plate.

18. The power storage module according to claim 13, further comprising a heat dissipation member disposed adjacent to a side surface of the power storage element, wherein
the heat transfer plate includes a first surface abutting the cooling member and a second surface opposite the first surface of the heat transfer plate,
the heat transfer plate includes a partition wall that extends from the first edge of the heat transfer plate in a direction normal to the first surface of the heat transfer plate, and
the partition wall is in surface contact with a side surface of the heat dissipation member.

19. The power storage module according to claim 18, wherein
the at least one deformed portion of the cooling member includes a first deformed portion, a second deformed portion, and a third deformed portion,
the first deformed portion abuts the first protrusion,
the second deformed portion abuts the second protrusion,
the third deformed portion abuts the third protrusion,
the at least one flat portion of the cooling member includes a first flat portion and a second flat portion,
the first flat portion is between the first deformed portion and the third deformed protrusion, and
the second flat portion is between the second deformed portion and the third deformed portion.

* * * * *